United States Patent [19]
McCord, Jr.

[11] 3,915,210
[45] Oct. 28, 1975

[54] DEVICE FOR EMPLOYING A RADIAL ARM SAW TO CUT A SPIRALLED GROOVE IN A WORKPIECE

[75] Inventor: Wilfred Murray McCord, Jr., Louisville, Ky.

[73] Assignee: Vermont American Corporation, Louisville, Ky.

[22] Filed: Feb. 13, 1975

[21] Appl. No.: 549,756

[52] U.S. Cl......... 144/136 R; 51/48 HE; 51/95 LH; 144/154
[51] Int. Cl.² ...................... B27C 5/00; B24B 5/18
[58] Field of Search............. 144/46, 47, 48, 136 R, 144/136 H, 134 B, 154; 51/48 HE, 95 LH; 90/11.62

[56] References Cited
UNITED STATES PATENTS

| | | | |
|---|---|---|---|
| 645,018 | 3/1900 | Schmaltz | 51/48 HE |
| 1,473,086 | 11/1923 | Davidson | 51/48 HE |
| 1,675,858 | 7/1928 | Litter | 51/48 HE |
| 2,142,669 | 1/1939 | Carpenter | 51/48 HE |
| 2,378,302 | 6/1945 | Kline | 51/95 LH |

Primary Examiner—Othell M. Simpson
Attorney, Agent, or Firm—Harry B. O'Donnell, III

[57] ABSTRACT

This invention provides a device for employing a radial arm saw to cut a spiralled groove in a workpiece, such as a leg for a table, chair, and the like. Basically, the device comprises: frame means rotatably journalling chuck means for holding the workpiece for rotation around an axis; and drive means mounted on the frame means and being interconnectable between the movable cutter carriage means of the radial arm saw and the chuck means to cause rotary movement of the workpiece around the axis in response to movement of the radial arm saw cutter carriage means in a direction generally parallel to the axis.

7 Claims, 12 Drawing Figures

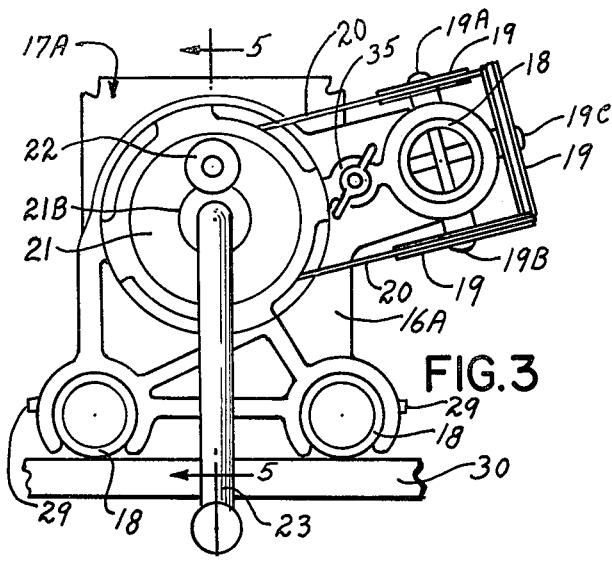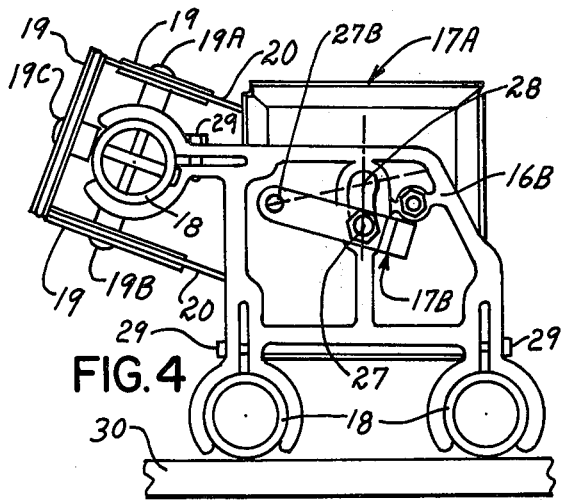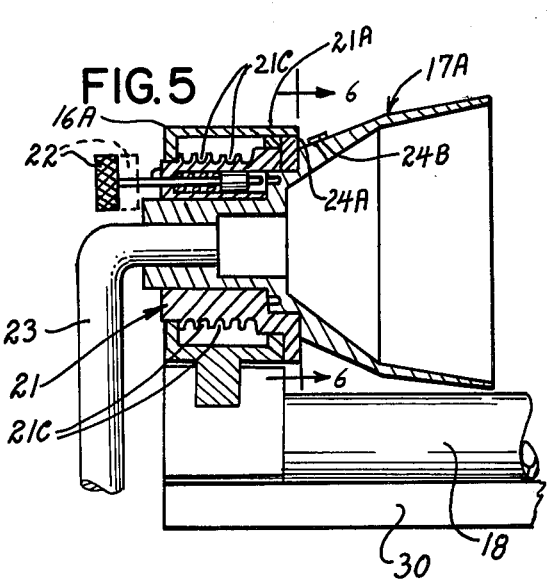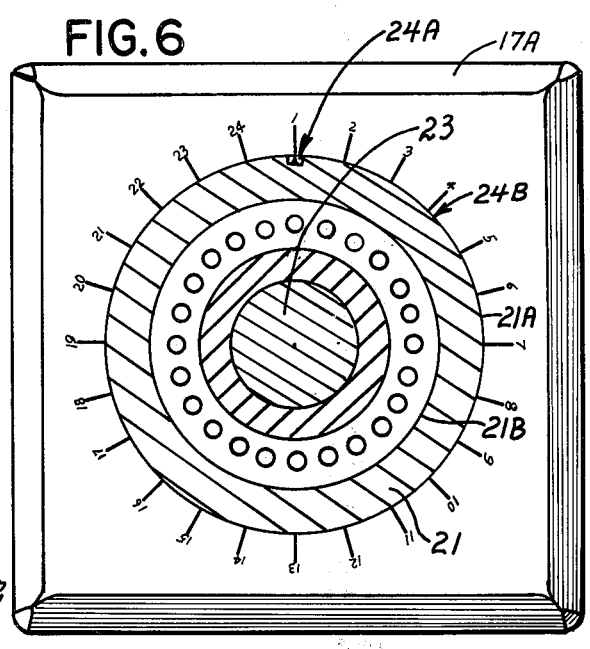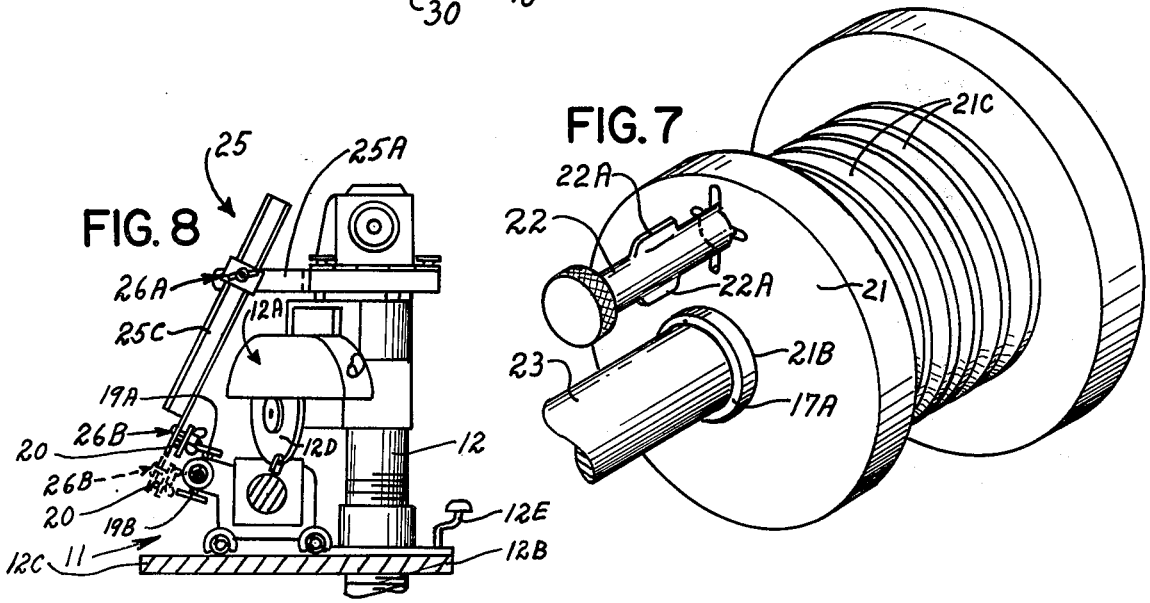

DEVICE FOR EMPLOYING A RADIAL ARM SAW TO CUT A SPIRALLED GROOVE IN A WORKPIECE

BACKGROUND OF THE INVENTION

This invention relates to means for cutting one or more grooves in a workpiece and, more particularly to a device for employing a radial arm saw to cut one or more spiralled grooves in a workpiece, such as a leg for a table, chair, and the like.

In the past, various means have been provided for cutting one or more grooves in a workpiece, such as a leg for a table, chair, and the like, as a decoration thereof. This grooving, which is commonly known as "roping", "fluting", and the like, was originally achieved hundreds of years ago by hand carving. In later years, large, cumbersome, complex, and expensive machines were built for mechanization and mass-production. These old machines were similar to what are presently commonly known in the metal working industry as, "universal milling machines". Naturally, because of their great expense and complexity of construction and operation, ownership and operation of these old machines by small, individual, "home" craftsmen have been highly impractical and rare. And, "job shops", owning these old and expensive machines, which are willing to economically perform this decorative grooving function for small, individual, home craftsmen, have now almost become extinct.

There are presently several million radial arm saws owned by small, individual, home craftsmen. And, in accordance with the present invention, there is provided a device, which is simple both in construction and operation and, consequently, inexpensive in cost of acquisition, when compared to the aforedescribed complex old machines, that permits the employment by a small, individual, home craftsman of a radial arm saw to cut one or more spiralled grooves in a workpiece, such as a leg for a table, chair, and the like.

SUMMARY OF THE INVENTION

The present invention provides a device for employing a radial arm saw to cut a spiralled groove in a workpiece, such as a leg for a table, chair, and the like. Basically, the device comprises: frame means rotatably journalling chuck means for holding the workpiece for rotation around an axis; and drive means mounted on the frame means and being interconnectable between the movable cutter carriage means of the radial arm saw and the chuck means to cause rotary movement of the workpiece around the axis in response to movement of the radial arm saw cutter carriage means in a direction generally parallel to the axis.

Preferably, the drive means comprises: pulley means rotatably mounted on the frame means; endless cable means tightly mounted around the pulley means and the rotatable chuck means; and fastener means for readily detachably connecting the radial arm saw cutter carriage means to the endless cable means. It is further desirable that bracket means be provided for interconnecting the drive means to the radial arm saw cutter carriage means and that such bracket means be carried by the radial arm saw cutter carriage means. It is yet further desirable that adjustment means be provided on the chuck means for selectively adjusting circumferential spacing around the axis between individual ones of a plurality of spiralled grooves which are to be cut in the workpiece, and that these adjustment means comprise: bearing means having a first bearing surface mounted in the frame means for rotation with respect thereto about the axis and a second bearing surface mounting the chuck means; retractable locking pin means mounted on the bearing means and movable between an inserted first position interlocking the bearing means and the chuck means for rotation together around the axis and a retracted second position permitting relative rotary movement between the chuck means and the bearing means around the axis; handle means mounted on the chuck means for initiating the relative rotary movement between the chuck means and the bearing means; and indicator means carried by the bearing means and the chuck means to indicate the amount of the relative rotary movement between the chuck means and the bearing means.

BRIEF DESCRIPTION OF THE DRAWINGS

The present invention is illustrated in the accompanying drawings, wherein:

FIG. 3 is a fragmentary elevational view of one end of the form of the novel device of the present invention shown in FIG. 2;

FIG. 4 is a view similar to that of FIG. 3, but showing the opposite end of the form of the novel device of the present invention shown in FIG. 2;

FIG. 5 is a fragmentary sectional view taken along line 5—5 of FIG. 3;

FIG. 6 is a somewhat enlarged fragmentary sectional view taken along line 6—6 of FIG. 5;

FIG. 7 is a greatly enlarged fragmentary perspective view illustrating a construction detail of the adjustable chuck means of the illustrated form of the novel device of the present invention.

FIG. 8 is a fragmentary sectional view, somewhat reduced in size, taken along line 8—8 of FIG. 2.

DETAILED DESCRIPTION

Figures 1A, 1B, 1C, 1D, 1E:
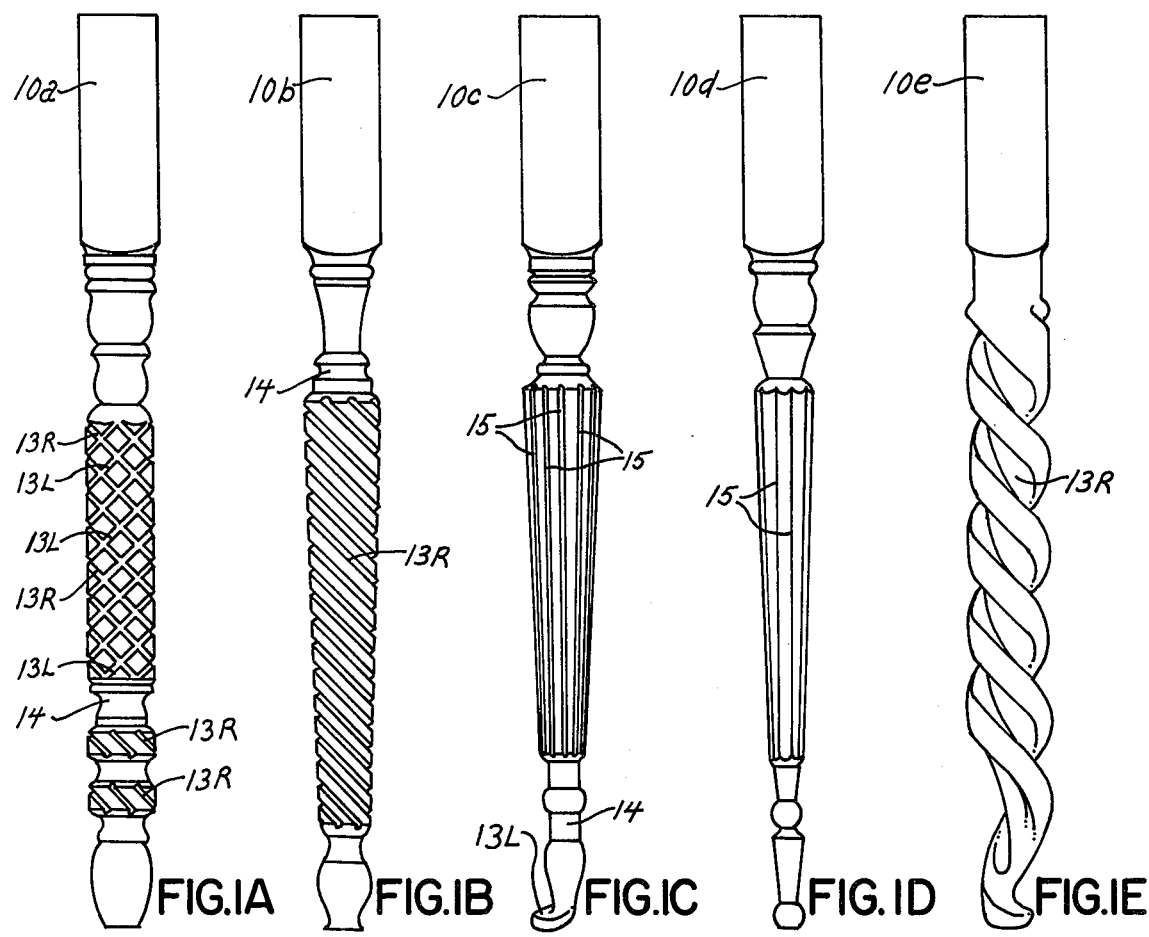
FIG. 1A – 1E are vertical side elevational views of several typical items, five table legs, as shown, which can be produced by utilizing a presently preferred form of the novel device that is provided in accordance with the present invention to employ a radial arm saw to cut one or more grooves in a workpiece.
Figure 2:
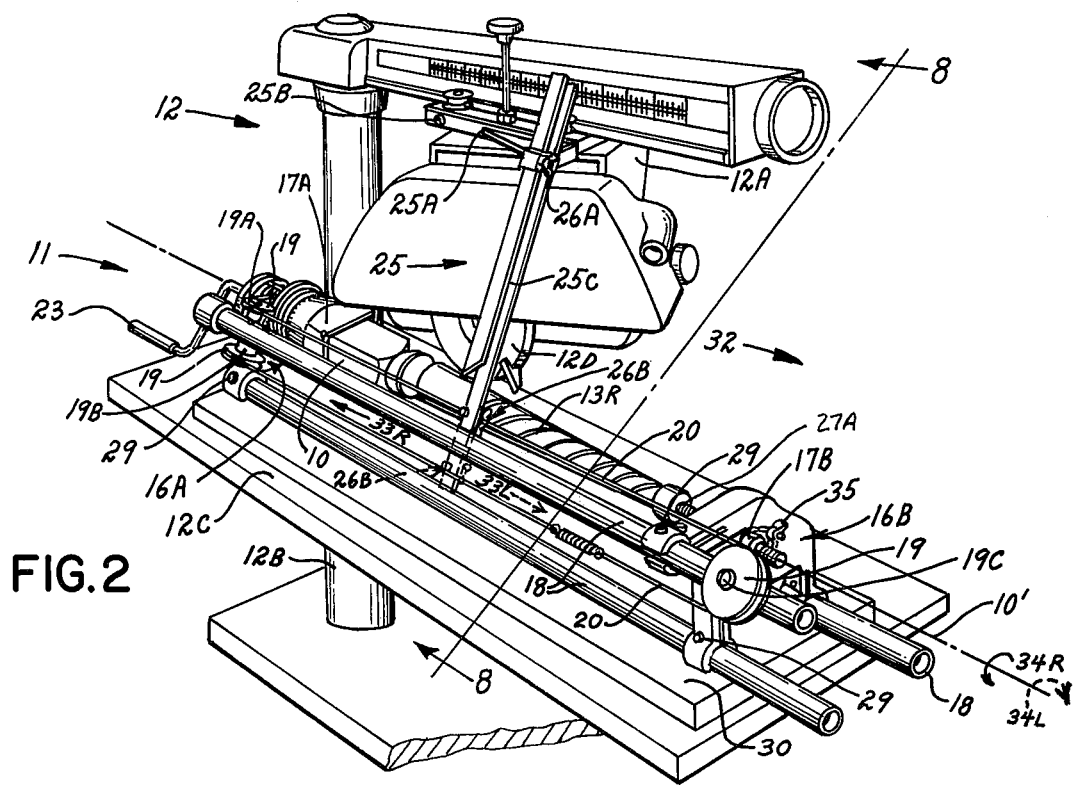
FIG. 2 is a somewhat schematic front perspective view illustrating a presently preferred form of the novel device of the present invention employing a radial arm saw to cut a spiral groove in a workpiece that is mounted in the device's chuck means.

Turning now to the drawings, and more particularly to FIGS. 1A–1E thereof, there are illustrated vertical side elevational views of several typical items, five table legs 10a–10e as shown, that can be produced by a home craftsman utilizing a presently preferred form of a novel device 11 which is provided in accordance with the present invention, such as that shown in FIGS. 2–8, to employ a typical radial arm saw 12, having cutter carriage means 12A supported on pedestal means 12B including a vertically adjustable table 12C for generally horizontal movement over and with respect to the table 12C, to cut one or more grooves in a workpiece 10, such as the wooden block shown in FIG. 2, with the radial arm saw cutter means 12D.

As illustrated in FIGS. 1A–1E and 2, the novel device 11 of the present invention can be utilized with the radial arm saw 12 to cut into the outer periphery of the workpiece 10 both left-hand and right-hand spiralled grooves or "ropes" 13L and 13R, as well as circular grooves or "rings" 14 and axial grooves or "flutes" 15, with respect to its major axis 10'.

Basically, as shown in FIGS. 2–8, the novel device 11 of the present invention comprises: frame means including end block means, such as the illustrated two generally vertically arranged and horizontally spaced apart end blocks 16A and 16B which can be supported on the radial arm saw table 12C to respectively journal first and second chuck means 17A and 17B and interconnected together by rods 18 for holding a workpiece, for rotation about an axis, such as the major axis 10' of the illustrated workpiece 10, and drive means, such as the illustrated pulley 19 and surrounding endless cable means 20, mounted on the frame means and being interconnectable between the movable cutter carriage means 12A of the radial arm saw 12 and the chuck means 17A to cause rotary movement of the workpiece 10 mounted therein generally around its axis 10' in response to movement of the radial arm saw cutter carriage means 12A in a direction generally parallel to that axis 10'.

In the illustrated form of the novel device 11 of the present invention, the first chuck means 17A which is rotatably journalled in a first one 16A of the two frame means end blocks 16A and 16B is adapted to receive and partially surround one end of the workpiece 10 (the upper end as illustrated in FIGS. 1A–1E and 2), while the second chuck means, which is rotatably journalled in the other one 16B of the two frame means end blocks 16A and 16B is adapted to engage the opposite end of the workpiece 10.

As shown in detail in FIGS. 2–3 and 5–7, the first chuck means 17A is rotatably journalled in the first end block 16A by bearing means 21 having a first bearing surface 21A mounted in the first end block 16A for rotation with respect thereto generally about the major axis 10' of the workpiece 10 and a second surface 21B which rotatably mounts the first chuck means 17A for possible rotation relative to that second bearing surface 21B and, of course, the bearing means 21, about that same axis 10'. Retractable locking pin means 22 are mounted on the bearing means 21 that are movable between an inserted first position (FIGS. 3 and 5) interlocking the bearing means 21 and the first chuck means 17A for united rotation together with respect to the frame means first end block 16A generally around the major axis 10' of the workpiece 10 and a retracted second position (FIG. 7) permitting relative movement between the first chuck means 17A and the bearing means 21 around the same axis 10'. And, handle means 23 are mounted on the first chuck means 17A for initiating relative rotary movement between the first chuck means 17A and the bearing means 21 when the retractable locking pin means 22 is in its retracted second position (FIG. 7), with indicator means 24A and 24B, as best shown in FIGS. 2 and 7, being respectively carried by the bearing means 21 and the first chuck means 17A to indicate the amount of any such relative rotary movement between the first chuck means 17A and the bearing means 21.

As also shown in FIGS. 2–7, the bearing means 21 for the first chuck means 17A has another outer surface 21C that is grooved to tightly receive the endless cable 20, which is, in turn, tightly mounted around the pulleys 19 of the drive means, such that, when the retractable pin means 22 is located in its inserted first position (FIGS. 3 and 5) movement of the endless cable 20 will cause united rotation of the then interlocked bearing means 21 and first chuck means 17A with respect to the frame means first end block 16A around the major axis 10' of the workpiece 10. As further illustrated, two of the drive means pulleys 19 are rotatably journalled on axles 19A and 19B provided on the first one 16A of the frame means end blocks 16A and 16B while a third such pulley is rotatably journalled on another axle 19C that is mounted on the other one 16B of those two end blocks 16A and 16B.

The novel device 10 of the present invention also includes fastener means 25 for readily detachably connecting the radial arm saw cutter carriage means 12A to the endless cable 20 of its drive means. And, as best shown in drawing FIGS. 2 and 8, these fastener means 25 comprise bracket means which can be carried by the radial arm saw cutter carriage means 12A and include a first bracket member 25A that can be removably fixed, as by a screw 25B, to the cutter carriage means 12A and a dependent second bracket member 25C which has its upper end adjustably, slidably connected to the first bracket member 25A by first clamp means 26A and has its lower end provided with second clamp means 26B that can be readily attached and detached to the endless cable 20.

As best shown in FIGS. 2 and 4, the second chuck means 17B which is rotatably journalled in the second end block 16B of the frame means need not be directly connectable to the endless cable 20 and pulleys 19 of the drive means, as is the case with the first chuck means 17A. In the illustrated form of the novel device 11 of the present invention, the second chuck means 17B merely comprises a screw 27 that is threaded into swiveled bearing means 28 that are mounted in the frame means second end block 16B for both rotation and swivel movement relative thereto generally around the major axis 10' of the workpiece 10. As shown in FIGS. 1A–1E, 2 and 4, one end 27A of the second chuck means screw 27 is adapted to be tightly engaged with the end of the workpiece 10 opposite that which is engaged within the first chuck means 17A, while the opposite end of the second chuck means screw 27 is provided with second handle means 27B for threading the screw 27 through the second bearing means 28 to move its first end 27A into and out of tight engagement with the end of the workpiece 10 opposite that which is engaged within the first chuck means 17A.

The aforedescribed arrangement of the second chuck means 17B permits the use of the novel device 11 of the present invention with workpieces 10 of a fairly wide variety of lengths. However, it is further desirable that the aforedescribed interconnections of both the first and second end blocks 16A and 16B to the rods 18 be made with readily attachable and detachable means such as the illustrated screws 29 to thus permit more gross adjustment of the spacing between the first and second chuck means 17A and 17B which are respectively mounted therein. This latter feature is also beneficial to both storage and packaging of the novel device 11 of the present invention.

To utilize the illustrated form of the novel device 11 of the present invention, an operator first erects its frame means by interconnecting the two end blocks 16A and 16B thereof to the rods 18 with the screws 29 provided for that purpose, as best shown in FIGS. 2–4, with the open end of the first chuck means 17A that is to receive one end of the workpiece 10 (the top end as shown in FIGS. 1A–1E and 2) facing the end 27A of the screw 27 of the second chuck means 17B that is to be tightly engaged with the opposite end of the workpiece 10. At this time, the operator sets the gross spacing between the two end blocks 16A and 16B to broadly accommodate the average lengths of the workpiece 10 upon which the device 11 is to be employed. The thus erected frame means of the device 11 is preferably located upon a board 30, which is, in turn, horizontally supported on the radial arm saw table 12C.

Next, the operator selects the particular workpiece 10 that is to be grooved and chucks it up in the now erected frame means of the novel device 11 of the present invention, as best shown in FIG. 2 by first inserting one of its ends (the upper end as shown in FIGS. 1A–1E) into the open end of the first chuck means 17A and then rotating the second handle means 27B of the screw 27 of the second chuck means 17B to tightly engage its end 27A with the opposite end (the bottom end as shown in FIGS. 1A–1E) of the workpiece 10 and thus align the workpiece 10 for rotation with respect to the frame means of the device 11 generally around the major axis 10' of the workpiece 10.

Then, the operator tightly mounts the drive means endless cable 20 around its pulleys 19 and the grooved outer surface 21C of the bearing means 21 for the first chuck means 17A.

Next, the operator connects the desired cutting means 12D to the power chuck of the radial arm saw cutter carriage means 12A in a well-known manner, with the cutting means 12D aligned generally over the major axis 10' of the chucked up workpiece 10.

Then, assuming the operator wants to cut a right-hand spiralled groove, such as the right-hand spiralled groove 13R illustrated in FIGS. 1A, 1B and 1E and 2 of the drawing, in the periphery of the chucked up workpiece 10, the operator then performs the following additional steps:

A. Next, the operator manually moves the cutter carriage means 12A relative to the radial saw pedestal means 12B to a point over the frame means of the device 11 aligning the cutting means 12D of the radial arm saw cutter carriage means 12A over the spot along the length of the periphery of the chucked up workpiece 10 where the operator desires the one end of the right-hand spiralled groove 13R to commence;

B. Then, the operator moves the retractable locking pin means 22 of the first chuck means 17A to its retracted second position (FIG. 7) and operates the handle means 23 of the first chuck means 17A to align the indicator means 24A and 24B at a first set position, preferably with the indicator means pointer 24A aligned with the "number 1 position" of the dial of the indicator means 24B, and then returns the retractable locking pin means 22 to its inserted first position (FIGS. 2, 3 and 5) again interlocking the bearing means 21 and the first chuck means 17A for united rotation together with respect to the frame means first end block 16A generally around the major axis 10' of the chucked up workpiece 10;

C. Next, the operator selectively adjusts the vertical location of the radial arm saw table 12C with respect to its pedestal means 12B, in a well-known manner, as by operating the crank 12E that is conventionally provided on such a radial arm saw 12 for that purpose (FIG. 8) to thereby selectively adjust the radial spacing between the cutting means 12D carried by the radial arm saw cutter carriage means 12A and the major axis 10' of the chucked up workpiece 10 so as to give the desired cutting depth of the spiralled groove 13R that is to be cut in the periphery of the workpiece 10.

D. Then, the operator interconnects the cutter carriage means 12A to the endless cable 20 of the drive means of the device 11 by employing the aforedescribed fastener bracket means 25 and the clamp means 26A and 26B provided therefor, by, first, fixing the first bracket member 25A with the screw 25B to the cutter carriage means 12A; next, fastening the lower end of the dependent second bracket member 25C to the endless cable 20 with the second clamp means 26B in its first position (as shown in solid lines in FIGS. 2 and 8); and finally, fastening the upper end of the dependent second fastening means bracket member 25C to the first fastener means bracket member 25A with the first clamp means 26A;

E. Next, the operator energizes the radial arm saw 12 in a well-known manner to thus initiate rotation of the cutting means 12D; and F. Then, the operator manually moves the radial arm saw cutter carriage means 12A and the bracket means 25 carried by it which now attach it to the endless cable 20 (towards the second chuck means 17B as shown by arrow 32 in FIG. 2) in a direction generally parallel to the major axis 10' of the chucked up workpiece 10, thus imparting movement to the endless cable 20 of the drive means as shown by the solid line arrow 33R in FIG. 2, while also causing simultaneously rotary movement (as shown by solid line arrow 34R in FIG. 2) of the chuck means 17A and 17B and the workpiece 10 chucked up therein about that same axis 10' with respect to the end blocks 16A and 16B of the novel device 11 of the present invention to thus produce, in combination with the action of the cutting means 12D of the radial arm saw 12, the right-hand spiralled groove 13R. This step is continued until the desired length of the groove 13R is achieved, whereupon, of course, the rotation of the radial arm saw cutting means 12D is then de-energized by the operator.

Should the operator then desire to cut a second right-hand spiralled groove 13R in the periphery of the chucked up workpiece 10, he then manually returns the radial arm saw cutter carriage means 12A and the fastener bracket means 25 carried by it which continue to attach it to the endless cable 20 to the starting point of the just-cut right-hand spiralled groove 13R. Then, the operator moves the retractable locking pin means 22 of the first chuck means 17A to its retracted second position (FIG. 7) and operates the handle means 23 of the first chuck means 17A to align the indicator means 24A and 24B at a second set position, such as with the indicator means pointer 24A aligned with the "number 4 position" of the dial of the indicator means 24B, thereby selectively adjustably setting the circumferential spacing between the second right-hand spiralled groove 13R and the one just previously cut as described above with respect to the major axis 10' of the chucked up workpiece 10, and then returns the retractable locking pin means 22 to its inserted first position (FIGS. 3 and 5) again interlocking the bearing means 21 and the first chuck means 17A for united rotation together with respect to the frame means first end block 16A generally around the major axis 10' of the chucked up workpiece 10. Next, the operator essentially repeats the aforedescribed Steps E and F to complete cutting of this second left-hand spiralled groove 13L in the outer periphery of the workpiece 10. And, he may also, similarly, utilize the novel device 11 of the present invention to cut a third or more right-hand spiralled grooves that are selectively circumferentially spaced apart from one another around the major axis 10' of the chucked up workpiece 10.

The operating procedure for employing the novel device 11 of the present invention to cut one or more left-hand spiralled grooves 13L (FIGS. 1A and 1C) is substantially the same as that previously described above regarding the right-hand spiralled groove 13R, except that in the aforedescribed Step D, the operator fastens the lower end of the dependent second fastener bracket member 25C to the endless cable 20 with the second clamp means 26B located in its second position (as shown in shadow lines in FIG. 8). With this alternative left-hand spiralled groove cutting arrangement, manual movement by the operator of the radial arm saw cutter carriage means 12A and the fastener bracket means 25 carried by it, which attach it to the endless cable 20, (toward the second chuck means 17B as shown by the arrow 32 in FIG. 2) in a linear direction generally parallel to the major axis 10' of the chucked up workpiece 10, will impart movement to the drive means endless cable 20 (as shown by the shadow line arrow 33L in FIG. 2), while also causing simultaneously rotary movement (as shown by shadow line arrow 34L in FIG. 2) of the chuck means 17A and 17B and the workpiece chucked up therein about that same axis 10' with respect to the end block 16A and 16B of the novel device 11 of the present invention to thus produce, in combination with the action of the cutting means 12D of the radial arm saw 12, the left-hand spiralled groove 13L.

Should the operator want to employ the novel device 11 of the present invention to cut circular grooves or rings 14 (as shown in FIGS. 1A–1D) into the workpiece 10, no connection is made between the cutter carriage means 12A and the endless cable 20 of the drive means. Instead, the radial arm saw cutter carriage means 12A, with its cutting means 12D de-energized, is manually aligned by the operator by sliding it linearly with respect to the radial arm saw blade pedestal means 12B to a point aligning the cutting means 12D over the spot along the length of the chucked up workpiece 10 where it is desired to cut each such circular groove or ring 14. Next, the operator locates the retractable locking pin means 22 in its retracted second position, where it is so retained by its detents 22A (FIG. 7), to permit free relative rotation between the first chuck means 17A and its bearing means 21 generally around the major axis 10' of the workpiece 10 chucked up therein. Then, the operator energizes the radial arm saw 12 to commence rotation of its cutting means 12D and begins rotation of the chucked up workpiece 10 generally around its major axis 10' by manually rotating the handle means 23 of the first chuck means 17A. Preferably, means, such as the clamp 35 best illustrated in drawing FIG. 3, are provided for engaging the bearing means 21 to the first end block means 16A to prevent any possible "sympathetic" rotation of the bearing means 21 during this operation.

And, should the operator wish to employ the novel device of the present invention with the radial arm saw 12 to cut axial grooves or flutes 15 (FIGS. 1C and 1D) in the outer periphery of the chucked up workpiece 10 which are circumferentially spaced apart around the major axis 10' thereof, the operator does not make any connection between the radial arm saw cutter carriage means 12A and the endless cable 20 of the drive means of the device 11.

To cut such axial grooves or flutes 15 in the workpiece 10 with the novel device 11 of the present invention, the operator first manually moves the radial arm saw cutter carriage means 12A, with its cutting means 12D de-energized, by sliding it linearly with respect to the radial arm saw pedestal means 12B to a point aligning the cutting means 12D over the spot along the length of the periphery of the chucked up workpiece 10 where the operator desires one end of the first such axial groove or flute 15 to commence. Next, the operator selectively adjusts the vertical location of the radial arm saw table 12C with respect to its pedestal means 12B, in a well-known manner, as by operating the crank 12E that is conventionally provided on such a radial arm saw 12 for that purpose (FIG. 8) to thereby selectively adjust the radial spacing between the cutting means 12D carried by the radial arm saw cutter carriage means 12A and the major axis 10' of the chucked up workpiece 10 so as to give the desired cutting depth of that axial groove or flute 15 which is to be cut into the periphery of the workpiece 10. Then, the operator energizes the radial arm saw 12 to commence rotation of its cutting means 12D. Next, the operator manually moves the radial arm saw cutter carriage means 12A by sliding it linearly with respect to the radial arm saw pedestal means 12B in a direction generally parallel to the major axis 10' of the chucked up workpiece 10. This step is continued until the desired length of the first such axial groove or flute 15 is achieved, whereupon, of course, the radial arm saw 12 is then de-energized to stop the rotation of its cutting means 12D. When employing the device 11 for this axial grooving or fluting operation, the only rotation of the chucked up workpiece 10 about its major axis 10' that should occur is performed by the operator through manual rotation of the handle means 23 of the first chuck means 17A so as to employ the retractable locking pin means 22 to selectively adjustably set the desired circumferentially spacing around the major axis 10' of the chucked up workpiece 10 between cuttings of the first and subsequent ones of such axial grooves or flutes 15 which may be cut in the periphery of the chucked up workpiece 10 through employment of the novel device 11 of the present invention.

The width of any of the aforedescribed grooves 13L, 13R, 14 or 15 is, of course, determined by the width of the cutting means 12D which is selectively employed by the operator in the powered chuck of the radial arm saw 12. And, the tapering of certain of the illustrated ones of such grooves is, of course, accomplished through the selected positioning by the operator of the swiveled bearing means 28 which rotatably journals the screw 27 of the second chuck means 17B in the second end block 16B of the frame means of the novel device 11 of the present invention with respect to the major axis 10' of the chucked up workpiece 10.

It should be apparent that while there has been described what is presently considered to be a presently preferred form of the present invention in accordance with the Patent Statutes, changes may be made in the disclosed device without departing from the true spirit and scope of this invention. It is, therefore, intended that the appended claims shall cover such modifications and applications that may not depart from the true spirit and scope of the present invention.

I claim:

1. A device for employing a radial arm saw having movable cutter carriage means for carrying cutter means and being supported on pedestal means including table means for generally horizontal movement over and with respect to said table means to cut a spiralled groove in a workpiece, such as a leg for a table, chair, and the like, comprising:
  a. frame means supportable on said radial arm saw table means and rotatably journalling chuck means for holding said workpiece for rotation around an axis; and
  b. drive means mounted on said frame means and being interconnectable between the movable cutter carriage means of said radial arm saw and said chuck means to cause rotary movement of said workpiece around said axis in response to movement of said radial arm saw cutter carriage means in a direction generally parallel to said axis,
  c. said drive means comprising:
    i. pulley means rotatably mounted on said frame means;
    ii. endless cable means tightly mounted around said pulley means and said rotatable chuck means; and
    iii. fastener means for readily detachably connecting said radial arm saw cutter carriage means to said endless cable means.

2. The invention of claim 1, wherein bracket means are provided for interconnecting said drive means to said radial arm saw cutter carriage means.

3. The invention of claim 2, wherein said bracket means is carried by said radial arm saw cutter carriage means.

4. The invention of claim 3, wherein adjustment means are provided on said chuck means for selectively adjusting circumferential spacing around said axis between individual ones of a plurality of spiralled grooves which are to be cut in said workpiece.

5. The invention of claim 4, wherein said adjustment means includes:
  a. bearing means having a first bearing surface mounted in said frame means for rotation with respect thereto about said axis and a second bearing surface mounting said chuck means;
  b. retractable locking pin means mounted on said bearing means and movable between an inserted first position interlocking said bearing means and said chuck means for rotation together around said axis and a retracted second position permitting relative rotary movement between said chuck means and said bearing means around said axis;
  c. handle means mounted on said chuck means for initiating said relative rotary movement between said chuck means and said bearing means;
  d. indicator means carried by said bearing means and said chuck means to indicate the amount of said relative rotary movement between said chuck means and said bearing means.

6. The invention of claim 1, wherein adjustment means are provided on said chuck means for selectively adjusting circumferential spacing around said axis between individual ones of a plurality of spiralled grooves which are to be cut in said workpiece.

7. The invention of claim 6, wherein said adjustment means includes:
  a. bearing means having a first bearing surface mounted in said frame means for rotation with respect thereto about said axis and a second bearing surface mounting said chuck means;
  b. retractable locking pin means mounted on said bearing means and movable between an inserted first position interlocking said bearing means and said chuck means for rotation together around said axis and a retracted second position permitting relative rotary movement between said chuck means and said bearing means around said axis;
  c. handle means mounted on said chuck means for initiating said relative rotary movement between said chuck means and said bearing means;
  d. indicator means carried by said bearing means and said chuck means to indicate the amount of said relative rotary movement between said chuck means and said bearing means.

* * * * *